United States Patent
Jang et al.

(10) Patent No.: US 9,522,585 B2
(45) Date of Patent: Dec. 20, 2016

(54) POLYMER COMPOSITE STRUT INSULATOR AND SUSPENSION SYSTEM FOR VEHICLE APPLYING THE SAME

(71) Applicants: Hyundai Motor Company, Seoul (KR); Iljin Co., Ltd., Gyeongju-si (KR)

(72) Inventors: Jun-Ho Jang, Yongin-si (KR); Hyun-Min Kang, Seongnam-si (KR); Chang-Kyu Kim, Hwaseong-si (KR); Deok-Woo Yun, Hwaseong-si (KR); Dong-Gyu Lim, Gwacheon-si (KR); Tea-Sung Kwon, Gyeongju-si (KR); Sung-Keun Lee, Seoul (KR)

(73) Assignees: Hyundai Motor Company, Seoul (KR); Iljin Co., Ltd., Gyeongju-si (KR)

( * ) Notice: Subject to any disclaimer, the term of this patent is extended or adjusted under 35 U.S.C. 154(b) by 0 days.

(21) Appl. No.: 14/838,824

(22) Filed: Aug. 28, 2015

(65) Prior Publication Data
US 2016/0221409 A1   Aug. 4, 2016

(30) Foreign Application Priority Data

Jan. 30, 2015 (KR) ......................... 10-2015-0015255

(51) Int. Cl.
*B60G 15/06* (2006.01)
*F16F 9/54* (2006.01)
*B60G 13/00* (2006.01)

(52) U.S. Cl.
CPC ........... *B60G 15/068* (2013.01); *B60G 13/003* (2013.01); *B60G 15/062* (2013.01);
(Continued)

(58) Field of Classification Search
CPC ..... B60G 15/068; B60G 15/067; B60G 15/07; B60G 15/062; B60G 2204/124; B60G 2204/1242; B60G 2204/12422; B60G 2204/128; B60G 2202/312; B60G 13/003; F16F 9/54
(Continued)

(56) References Cited

U.S. PATENT DOCUMENTS

| 6,786,646 | B2 * | 9/2004 | Handke | F16F 9/54 |
| | | | | 267/220 |
| 8,813,924 | B2 * | 8/2014 | Matsumura | B60G 15/068 |
| | | | | 188/321.11 |
| 2002/0163155 | A1 * | 11/2002 | Kawada | B60G 13/003 |
| | | | | 280/124.155 |

FOREIGN PATENT DOCUMENTS

| JP | 62041435 A | * | 2/1987 |
| JP | 02085004 A | * | 3/1990 |

(Continued)

*Primary Examiner* — Keith Frisby
(74) *Attorney, Agent, or Firm* — Morgan, Lewis & Bockius LLP

(57) ABSTRACT

A polymer composite strut insulator may include a polymer composite bracket made of polymer composite, divided into a mounting fastening portion having an inserter into which mounting bolts are press-inserted to penetrate and a bearing assembling portion, and provided with a central hole at a central portion, an elastic mass cross-linked to the polymer composite bracket in order for the cup hole surrounding the central hole formed at the central portion of the polymer composite bracket to be divided into an upper cup hole and a lower cup hole, the upper cup hole being coupled to an upper cup and the lower cup hole being coupled to a lower cup, and a bearing disposed at the bearing assembling portion.

14 Claims, 11 Drawing Sheets

(52) U.S. Cl.
CPC .. *B60G 2202/143* (2013.01); *B60G 2202/312* (2013.01); *B60G 2204/124* (2013.01); *B60G 2204/125* (2013.01); *B60G 2204/128* (2013.01); *F16F 9/54* (2013.01)

(58) Field of Classification Search
USPC .................................. 280/124.155, 124.147
See application file for complete search history.

(56) References Cited

FOREIGN PATENT DOCUMENTS

| | | | |
|---|---|---|---|
| JP | 2003-278822 A | | 10/2003 |
| JP | 2005133952 A | * | 5/2005 |
| JP | 2007-10005 A | | 1/2007 |
| JP | 2007-127172 A | | 5/2007 |
| JP | 4413228 B2 | | 2/2010 |
| JP | 2012-180873 A | | 9/2012 |
| JP | 2013-122252 A | | 6/2013 |
| KR | 10-2006-0120563 A | | 11/2006 |
| KR | 10-2008-0042345 A | | 5/2008 |
| KR | 10-2010-0006075 A | | 1/2010 |
| KR | 10-2014-0127952 A | | 11/2014 |

* cited by examiner

A VIEW

SECTION A-A

SECTION B-B

CUT-AWAY GROOVE

PERSPECTIVE VIEW FROM B-1 DIRECTION

PERSPECTIVE VIEW FROM B-2 DIRECTION

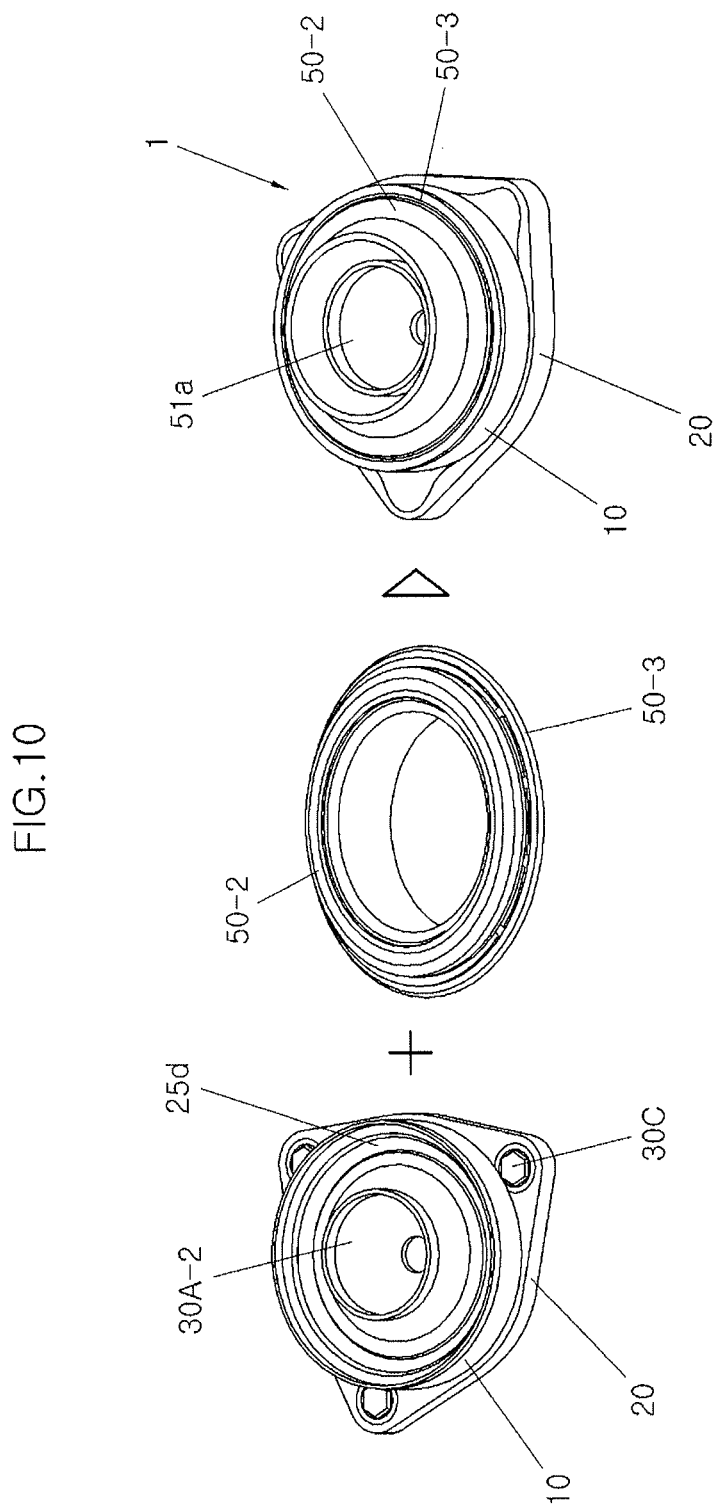

POLYMER COMPOSITE STRUT INSULATOR AND SUSPENSION SYSTEM FOR VEHICLE APPLYING THE SAME

CROSS-REFERENCE TO RELATED APPLICATION

The present application claims priority to Korean Patent Application No. 10-2015-0015255, filed Jan. 30, 2015, the entire contents of which is incorporated herein for all purposes by this reference.

BACKGROUND OF THE INVENTION

Field of the Invention

The present invention relates to bearing integrated strut insulator, and more particularly, to suspension system for vehicle capable of improving vehicle Noise, Vibration, Harshness (NVH) performance and productivity by applying a strut insulator which is made of polymer composite to reduce its weight and achieves components unification with a strut bearing.

Description of Related Art

In general, an insulator applied to suspension system for a vehicle contributes to improve ride comfort by absorbing and reducing vibration caused by the excitation of an engine or transmitted from the road while the vehicle is running.

As an example of such insulator, there is an insulator applied to a strut of a shock absorber forming the suspension system to connect the shock absorber to a vehicle body. The insulator may include a plurality of brackets coupled with a rubber damper for absorbing shock and surrounding the damper, and bolts for being fixed to the vehicle body, and so on.

However, the insulator has been inevitably a relative high weight part compared to the its size since it is required to include steel bracket for supporting the suspension system stably with rubber material making damping action against the external force. According to this, the insulator has also been required to reduce its weight in order to meet the fuel efficiency improvement demanded due to further enhanced environmental regulations in recent years.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to reducing weight and the number of components by providing a shock absorber absorbing road impact and a polymer composite strut insulator that are composed of bearing integrated polymer composite, and particularly, are directed to providing a suspension system for a vehicle capable of greatly improving vehicle Noise, Vibration, Harshness (NVH) performance by applying the polymer composite strut insulator to a shock absorber strut.

According to various aspects of the present invention, a polymer composite strut insulator may include a polymer composite bracket made of polymer composite, divided into a mounting fastening portion having an inserter into which mounting bolts are press-inserted to penetrate and a bearing assembling portion, and provided with a central hole at a central portion, an elastic mass cross-linked to the polymer composite bracket in order for the cup hole surrounding the central hole formed at the central portion of the polymer composite bracket to be divided into an upper cup hole and a lower cup hole, the upper cup hole being coupled to an upper cup and the lower cup hole being coupled to a lower cup, and a bearing disposed at the bearing assembling portion.

The polymer composite may include fiber reinforced plastics reinforced by glass fiber or carbon fiber.

The mounting fastening portion and the bearing assembling portion may be connected to a rubber injection passage, the rubber injection passage may be formed with cut-away grooves communicated with the central hole, and the mounting fastening portion, the bearing assembling portion and the rubber injection passage may be injection-molded to be integrated with each other.

The mounting fastening portion may be formed with insert holes into which the inserter is disposed respectively, and the insert holes may be formed at at least three positions.

The bearing assembling portion may include a lower hollow concentric body formed integrally with the rubber injection passage, a lower expansion concentric body surrounding the lower hollow concentric body to form a concentric circle, and an insert surface forming two stepped portions to the lower expansion concentric body.

The lower hollow concentric body may include an inner stepped surface with the rubber injection passage to form a concentric circle.

The insert surface may be formed with a plurality of ribs.

The insert surface may be provided with a bearing ball rail inserter made of metal, the bearing ball rail inserter may be integrated with the bearing assembling portion when injection molding the bearing assembling portion, and the bearing may be seated in the bearing ball rail inserter.

The elastic mass may be made of rubber cross-linked using a rubber injection mold, and the upper cup hole and the lower cup hole may have different inner diameters, respectively.

The upper cup and the lower cup may be fixed via fixing portions coupled to each other while inserted into the upper cup hole and the lower cup hole, respectively.

The inserter may include a bolt shaft boss into which the mounting bolts are press-inserted to penetrate, a portion of the bolt shaft boss may be thicker than other portions, and the inserter may be integrated with the polymer composite bracket when injection molding the polymer composite bracket.

The inserter may be made of carbon steel or forged aluminum material.

The bearing may be coupled to the bearing assembling portion via a bearing sealer.

According to various aspects of the present invention, a suspension system for a vehicle may include a shock absorber configured with a cylinder housing to be coupled to wheels via a knuckle, a suspension spring coupled to the shock absorber, and a polymer composite strut insulator configured to be coupled to a strut rod of the shock absorber to be fixed to a vehicle body, in which the polymer composite strut insulator may include a polymer composite bracket made of polymer composite, and divided into a mounting fastening portion having an inserter and a bearing assembling portion integrated with the mounting fastening portion via a rubber injection passage, an elastic mass cross-linked to the polymer composite bracket and forming cup holes into which an upper cup and a lower cup coupled to each other are inserted, mounting bolts press-inserted into and penetrating the inserter to be fixed to the vehicle body, and a bearing tightly contacted to a bearing ball rail inserter formed at the bearing assembling portion.

As described above, the present invention may improve vehicle NVH by the strut insulator made of polymer composite for connecting the shock absorber absorbing road impact to the vehicle body.

Further, the present invention may achieve components lightweight and components unification by the polymer composite strut insulator dualized to the upper case and the lower case accommodating the bearing, and particularly, may improve productivity by assembling simplification and quality by removing the gap between the insulator and the bearing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 is a detailed diagram of the polymer composite bracket, a bearing and a bearing sealer forming the exemplary polymer composite strut insulator according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
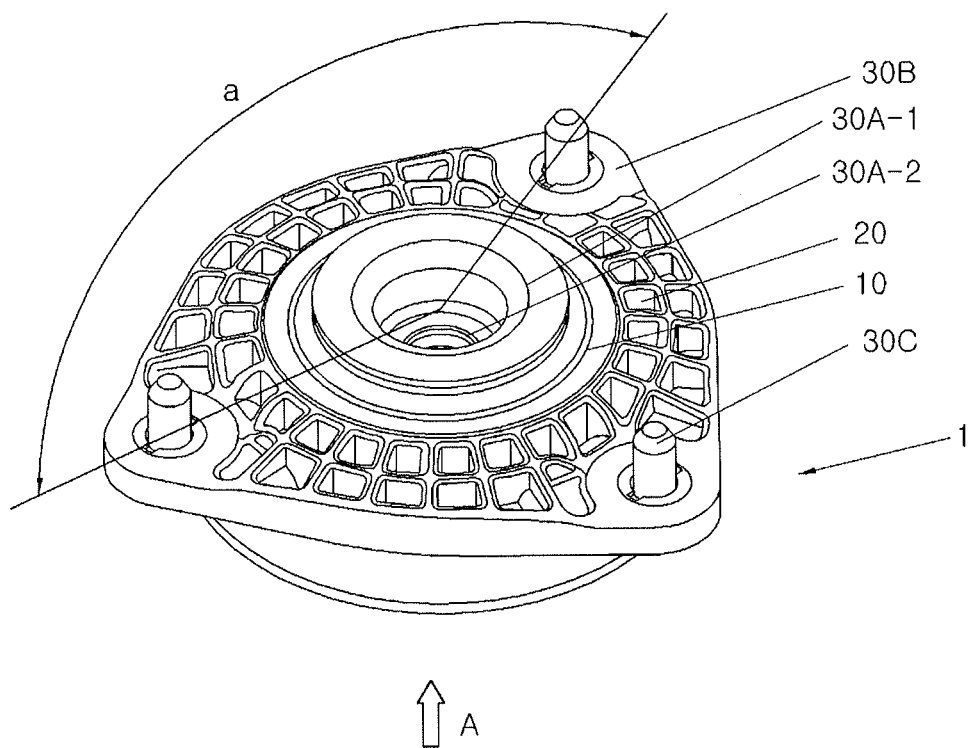
FIG. 1A and FIG. 1B are diagrams of an exemplary polymer composite strut insulator according to the present invention.
Figure 1B:
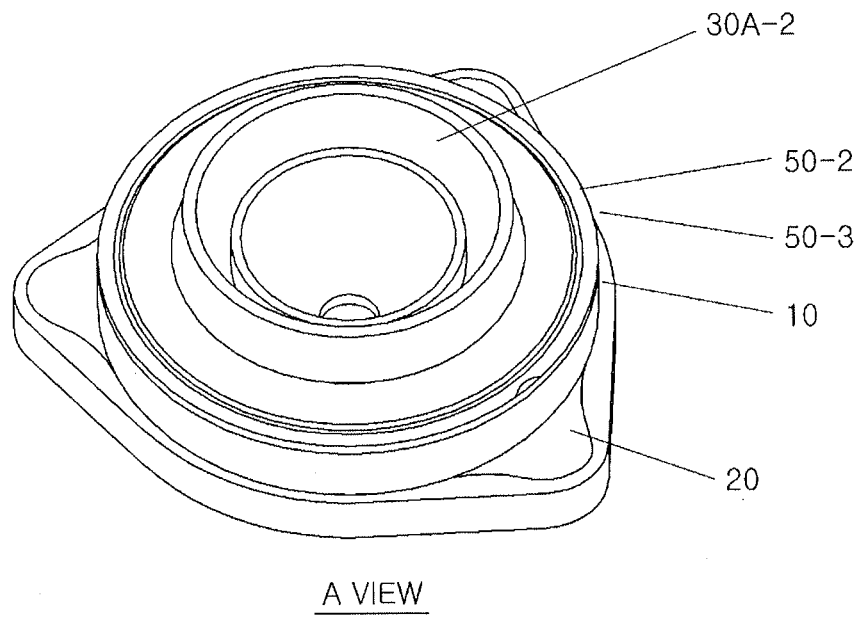
Figure 2:
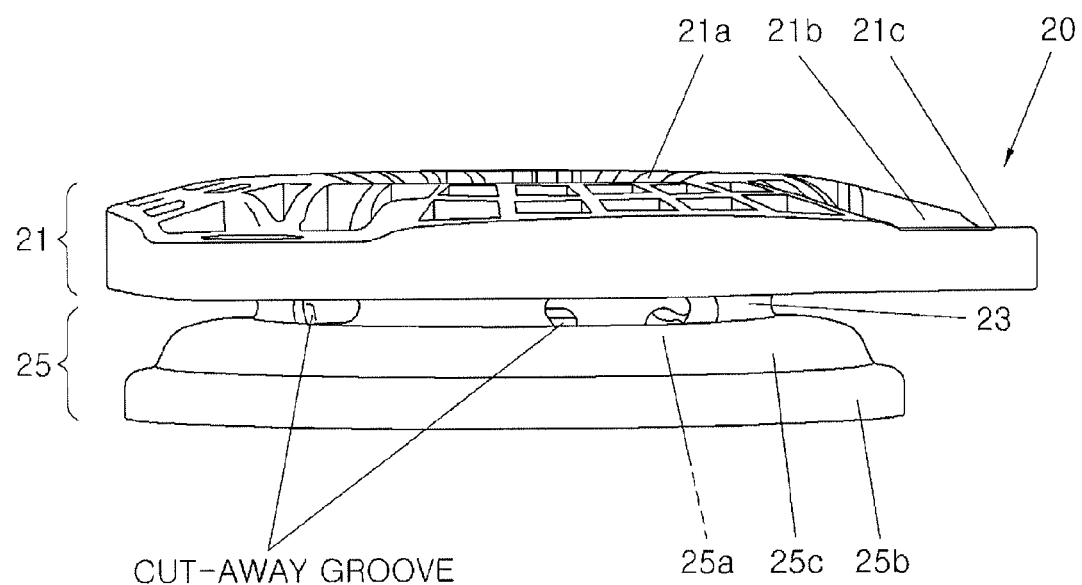
FIG. 2 is a diagram of an exemplary polymer composite according to the present invention.
Figure 3:
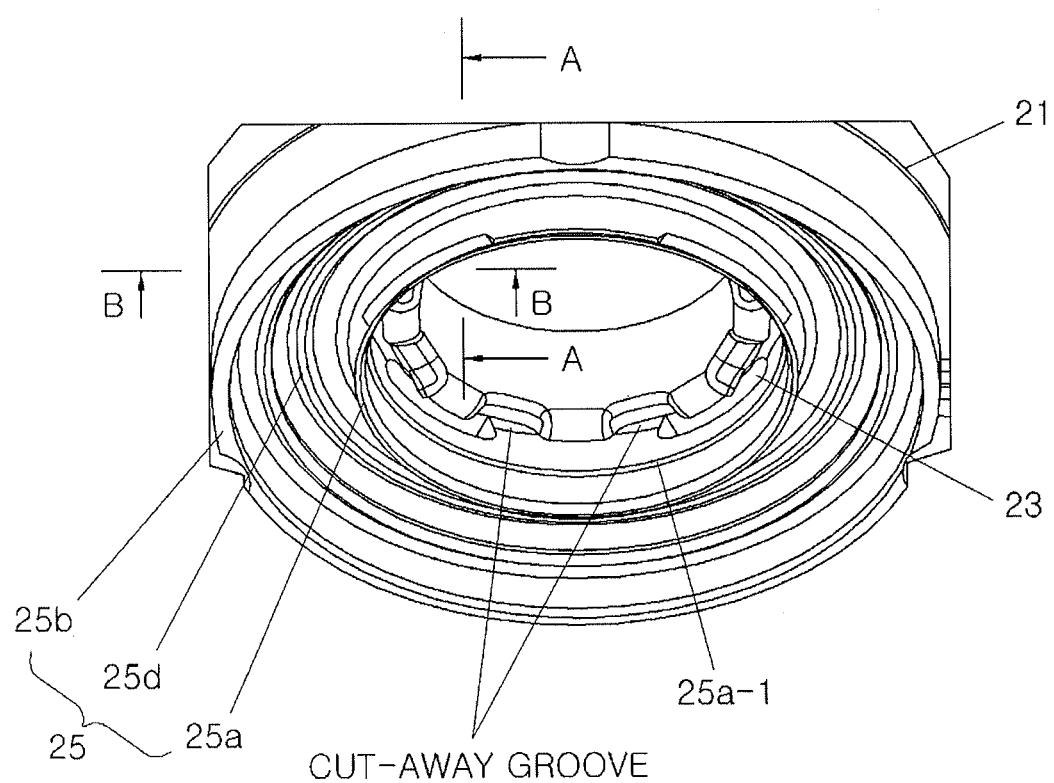
FIG. 3 is a detailed diagram of a bearing assembling portion forming the polymer composite bracket according to the present invention.
Figure 4A:
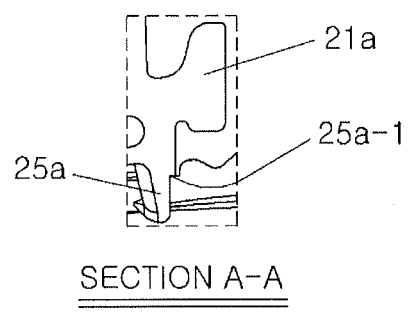
FIG. 4A and FIG. 4B are partial cross-sectional views of FIG. 3.
Figure 4B:
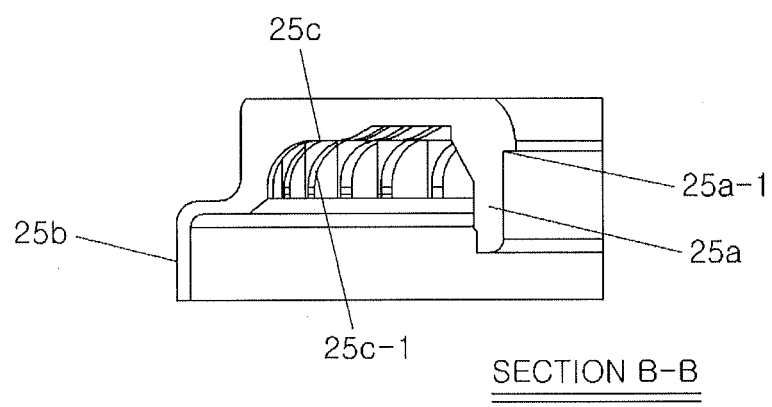

FIG. 1 represents a diagram of a polymer composite strut insulator 1 according to the present invention.

As shown in FIG. 1, the polymer composite strut insulator 1 may include an polymer composite bracket 20 to which rubber is cross-linked and a bearing seating portion is integrated, a pair of cups 30A-1, 30A-2 coupled to a central hole formed at the polymer composite bracket 20, an inserter 30B coupled to an edge portion of the polymer composite bracket 20 and passed through by mounting bolts 30C. Particularly, the pair of cups 30A-1, 30A-2, the inserter 30B and the mounting bolts 30C are integrated with the polymer composite bracket 20.

The polymer composite bracket 20 may include an upper bracket at which a bearing assembling portion 25 is integrally formed and an elastic mass 10 cross-linked to the upper bracket. Particularly, the upper bracket and the bearing assembling portion 25 may be made of polymer composite. As an example, the polymer composite may be fiber reinforced plastics reinforced by glass fiber or carbon fiber. Further, the polymer composite bracket 20 may be manufactured through an injection or transfer molding process.

The pair of cups 30A-1, 30A-2 may include an upper cup 30A-1 and a lower cup 30A-2 made of steel. Particularly, a lower portion of the upper cup 30A-1 is coupled with an upper portion of the lower cup 30A-2.

The inserter 30B may be integrally formed with the polymer composite bracket 20 when injection molding or transfer molding the polymer composite bracket 20. Particularly, the inserter 30B is disposed on each vertex of approximately equilateral triangle to form three inserters positioned with 120-degree angle interval.

The mounting bolts 30C are press-fitted through the inserter 30B from the bottom of the polymer composite bracket 20 to fasten to a counterpart component with screw. The counterpart component may be a vehicle body portion to which a shock absorber of strut suspension device is coupled.

FIG. 2 to FIG. 6 represent detailed configuration examples of the polymer composite bracket 20 and an elastic mass 10 according to the present invention.

Referring to FIG. 2 to FIG. 4B, the polymer composite bracket 20 may include a mounting fastening portion 21 forming a central hole and a bearing assembling portion 25 divided from the mounting fastening portion 21 by a rubber injection passage 23 forming a concentric circle with the central hole at the bottom of the mounting fastening portion 21. The mounting fastening portion 21, the rubber injection passage 23 and the bearing assembling portion 25 may be integrally injection-molded.

Concretely, the mounting fastening portion 21 may include a mounting body 21b provided with an upper hollow concentric body 21a forming a central hole and insert holes 21c penetrated at the mounting body 21b. The insert holes 21c may be formed with 120-degree angle interval at three positions, which may form vertices of an approximately equilateral triangle, such that the overall shape of the mounting body 21b may form the approximately equilateral triangle. The mounting bolts 30C may be assembled to each of the insert holes 21c.

Concretely, the rubber injection passage 23 may form a concentric circle with a larger diameter than that of the upper hollow concentric body 21a at the bottom of the upper hollow concentric body 21a, connect the mounting fastening portion 21 to the bearing assembling portion 25, and may be formed with cut-away grooves with a predetermined interval to each other to be communicated with the central hole.

Therefore, the rubber injection passage 23 may be surrounded by rubber when cross-linking the elastic mass 10 and play a role of a passage through which the cross-linked rubber becomes ingrained into to the central hole in order to surround an inner portion 21a.

Concretely, the bearing assembling portion 25 may include a lower hollow concentric body 25a formed integrally with the rubber injection passage 23, a lower expansion concentric body 25b surrounding the lower hollow concentric body 25a to form a concentric circle, and an insert surface 25c forming two stepped portions to the lower expansion concentric body 25b and seated by a bearing ball rail inserter 25d. Particularly, the lower hollow concentric body 25a may include an inner stepped surface 25a-1 with the rubber injection passage 23 to form a concentric circle, such that a rubber injection mold is hanged to the inner stepped surface 25a-1 to block the top portion and the bottom portion of the rubber injection passage 23. Therefore, it is able to prevent rubber from being permeated toward the insert surface 25c during cross-linking the rubber for forming the elastic mass 10. Further, the insert surface 25c is formed with a plurality of ribs 25c-1, thereby easily ensuring the dimensional stability on the bearing ball rail inserter 25d and minimizing the heat deformation of composite on cooling after forming it. The bearing ball rail inserter 25d may facilitate ensuring bearing concentricity and the dimensional stability of the bearing such as the role of the ribs 25c-1. The bearing ball rail inserter 25d may be made of metal.

Figure 5A:
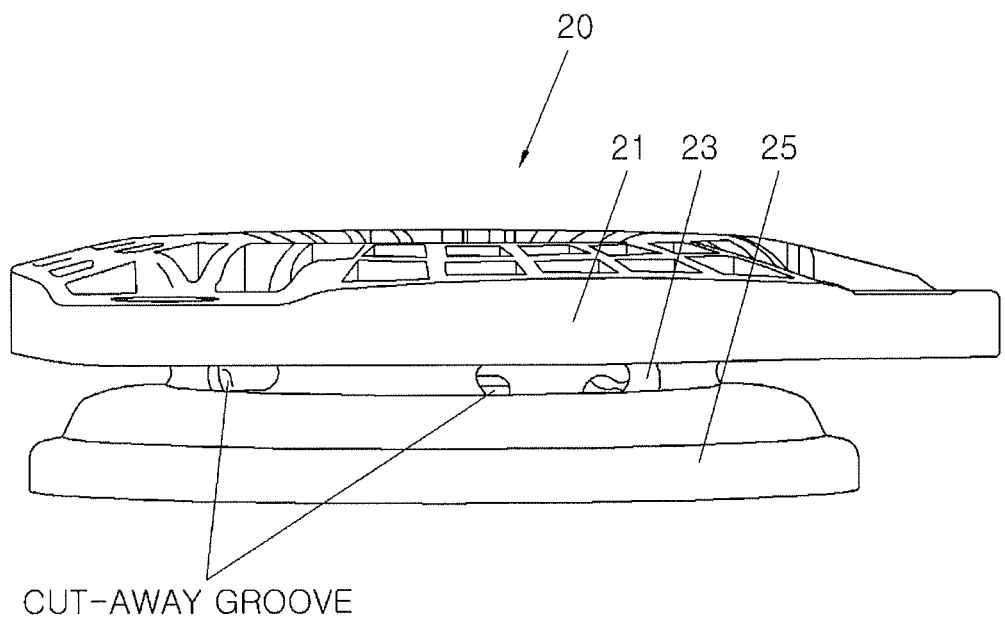
FIG. 5A and FIG. 5B are coupled diagrams of the polymer composite bracket and an elastic mass-according to the present invention.
Figure 5B:
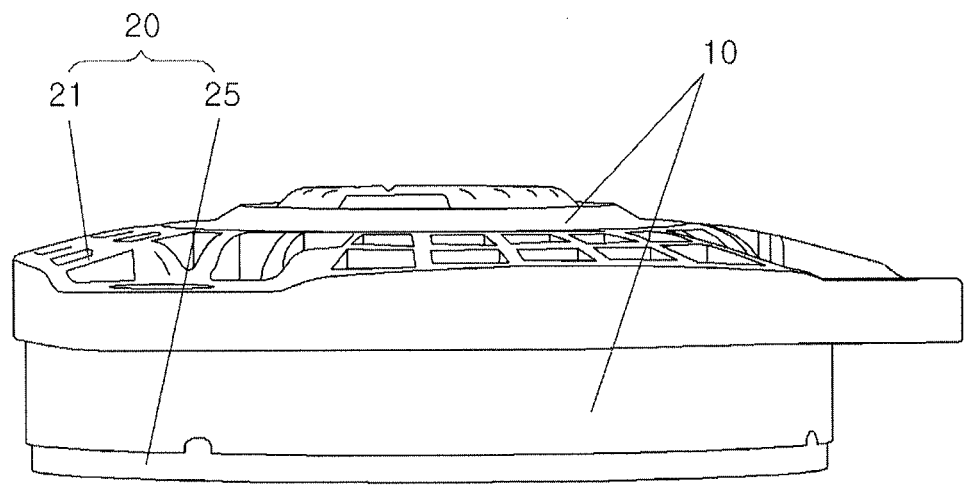
Figure 6:
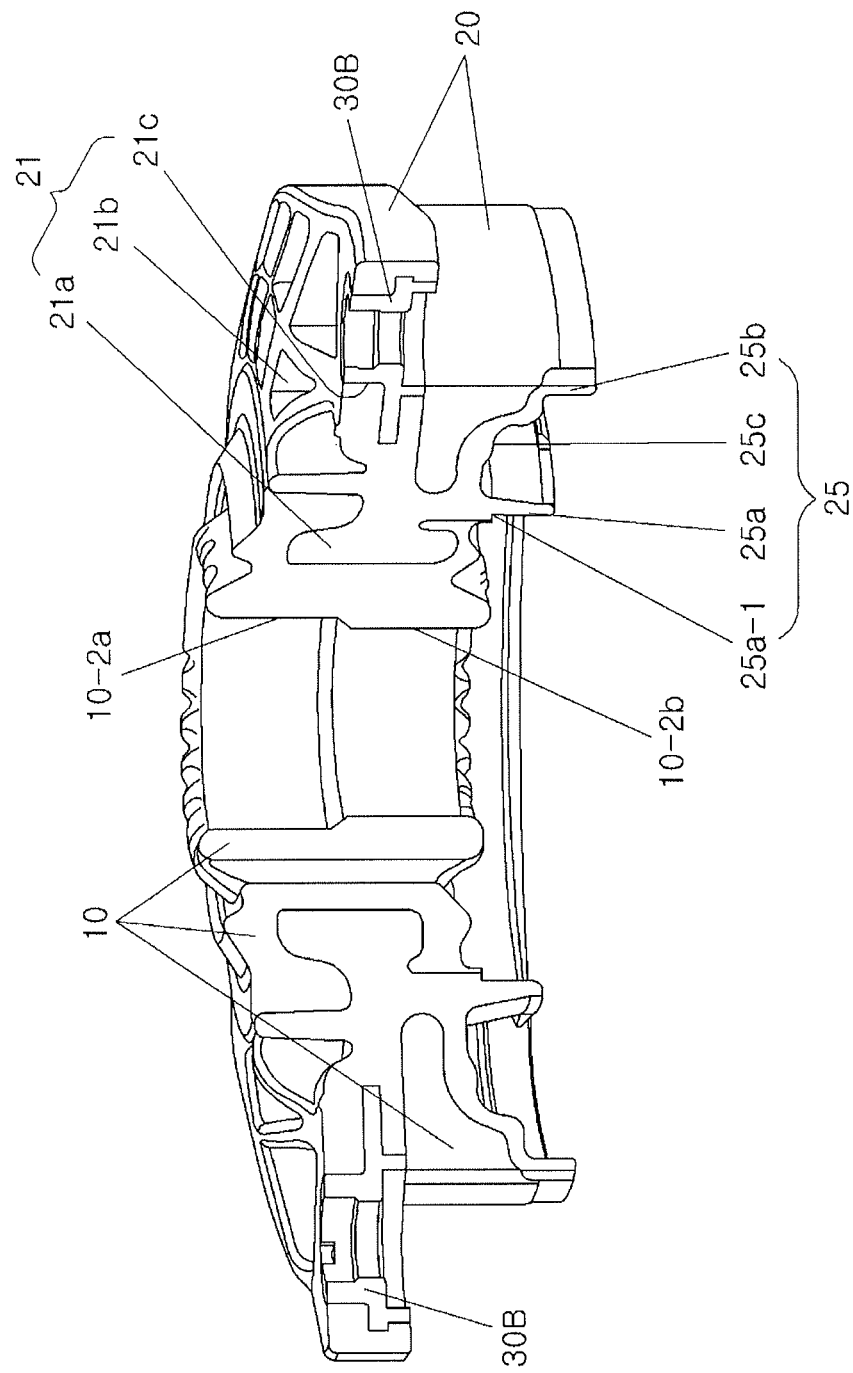
FIG. 6 is a cut-away perspective view of FIG. 5A and FIG. 5B.

Referring to FIG. 5A, FIG. 5B, and FIG. 6, the elastic mass 10 may be made of rubber and formed with the polymer composite bracket 20 through cross-linking molding using a rubber injection mold. For this, the polymer composite bracket 20 is coupled to the rubber injection mold with being hanged at the inner stepped surface 25a-1 and then, cross-linked with the injected rubber, such that the rubber is flowed into the cut-away grooves of the rubber injection passage 23 to form a hollow hole at an inner space of the mounting fastening portion 21 and surround it, but not to surround an inner space of the bearing assembling portion 25.

As a result, the polymer composite bracket 20 and the elastic mass 10 may be integrated with each other, such that the polymer composite bracket 20 may effectively attenuate the vibration transmitted through a strut rod as well as through a suspension spring and a bearing. Particularly, the central hole formed by the elastic mass 10 may be divided into an upper cup hole 10-2a to which the upper cup 30A-1 is coupled and a lower cup hole 10-2b to which the lower cup 30A-2 is coupled. The inner diameter of the upper cup hole 10-2a is larger than the inner diameter of the lower cup hole 10-2b, thereby easily setting the assembling positions of the upper cup 30A-1 and the lower cup 30A-2.

FIG. 7 to FIG. 9B represent detailed configurations examples of the cups 30A-1, 30A-2, the inserter 30B and the mounting bolts 30C forming the polymer composite strut insulator 1 according to the exemplary embodiment of the present invention.

Figure 7:
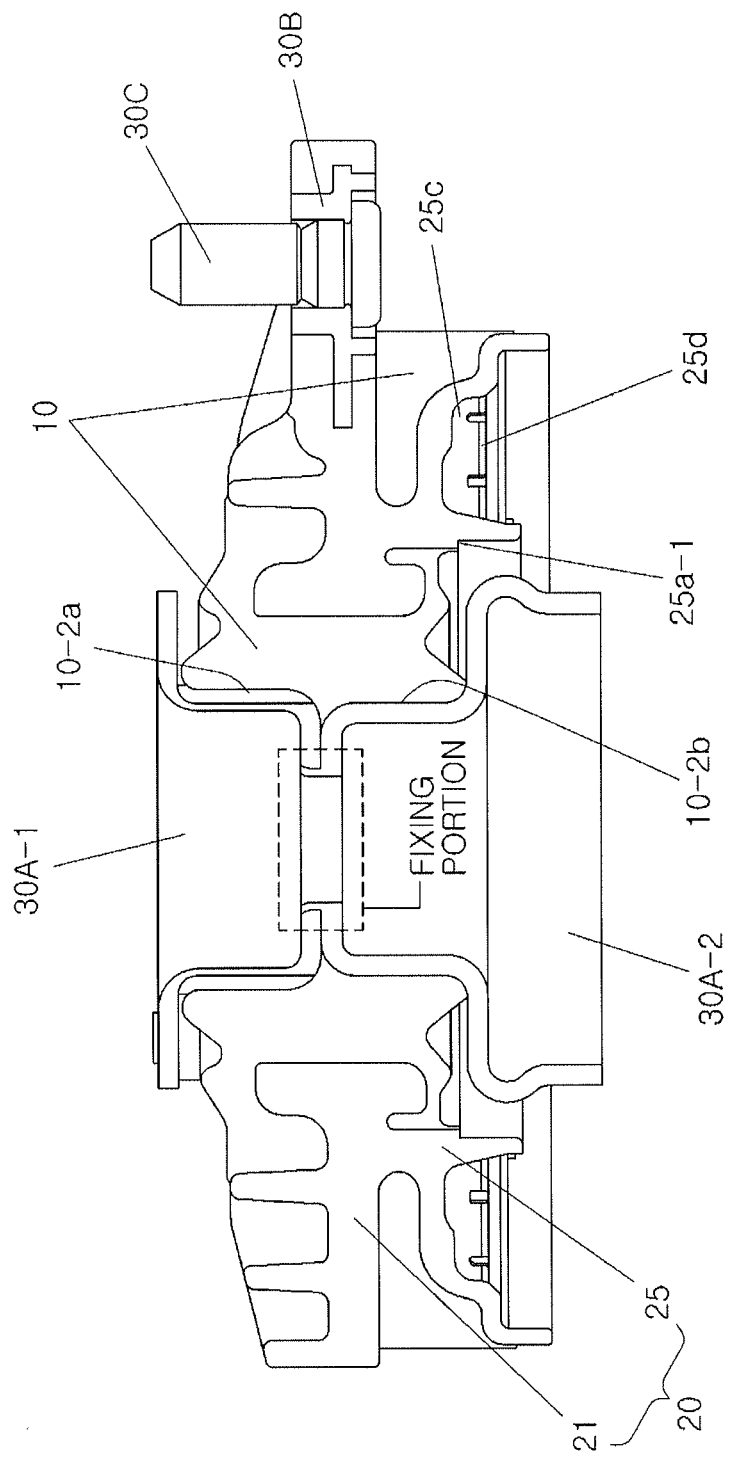
FIG. 7 is a detailed diagram of a cup, an inserter and mounting bolts forming the exemplary polymer composite strut insulator according to the present invention.

Referring to FIG. 7, the pair of cups 30A-1, 30A-2 may include the upper cup 30A-1 coupled to the upper cup hole 10-2a and the lower cup 30A-2 coupled to the lower cup hole 10-2b formed by the elastic mass 10, respectively. Particularly, the upper cup 30A-1 and the lower cup 30A-2 may form more stably fixed state by forming fixing portions and being coupled to each other via those. For this, the fixing portions may include a hole penetrated through the bottom of the upper cup 30A-1 and a projection formed at the bottom of the lower cup 30A-2 to be inserted into the hole.

Figure 8:
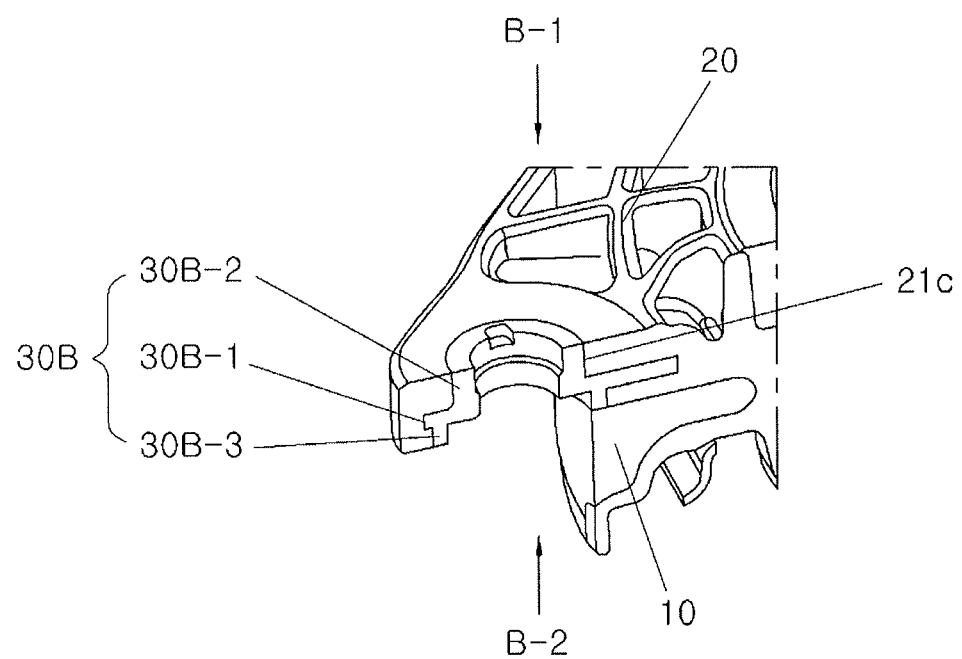
FIG. 8 is a cut-away perspective view of the cup and the inserter forming the exemplary polymer composite strut insulator according to the present invention.
Figure 9A:
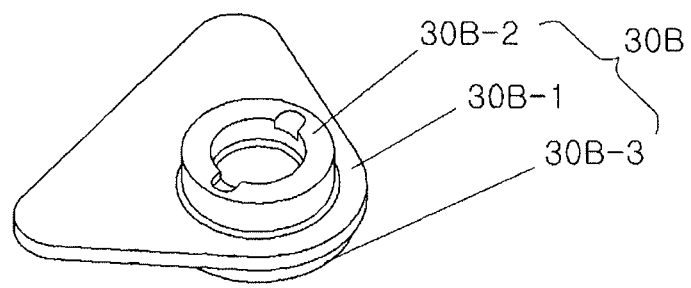
FIG. 9A and FIG. 9B are partial perspective views of FIG. 8.
Figure 9B:
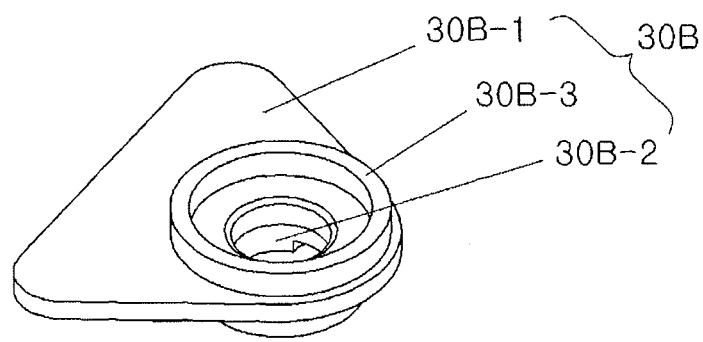

Referring to FIG. 8, FIG. 9A and FIG. 9B, the inserter 30B may be made of carbon steel (S200C, etc.) or forged aluminum material (6,000 series) and may be integrated with the mounting fastening portion 21 by using the insert hole 21c when injection molding or transfer molding of the polymer composite bracket 20. For this, the inserter 30B may include a tight contact body 30B-1 having hole penetrated at one vertex of an approximately equilateral triangle, a bolt shaft boss 30B-2 projected at one surface of the tight contact body 30B-1 to surround around the hole and a bolt head boss 30B-3 projected at the other surface of the tight contact body 30B-1 to surround around the hole. Each projected heights of the bolt shaft boss 30B-2 and the bolt head boss 30B-3 may preferably be the height capable of blocking the molding material penetration. Particularly, the bolt shaft boss 30B-2 may be formed with the thickness capable of meeting the separation force of the mounting bolt 30C, thereby becoming thicker than the tight contact body 30B-1 and the bolt head boss 30B-3.

FIG. 10 shows detailed configurations example of the polymer composite bracket 20, bearing 50-2 and the bearing sealer 50-3 forming the polymer composite strut insulator 1 according to various embodiments of the present invention.

As shown in FIG. 10, the bearing 50-2 may include a roller type bearing and couple to the bearing assembling portion 25 of the polymer composite bracket 20 via the bearing sealer 50-3. Therefore, the bearing 50-2 may be seated in the bearing ball rail inserter 25d of the polymer composite bracket 20.

Figure 11:
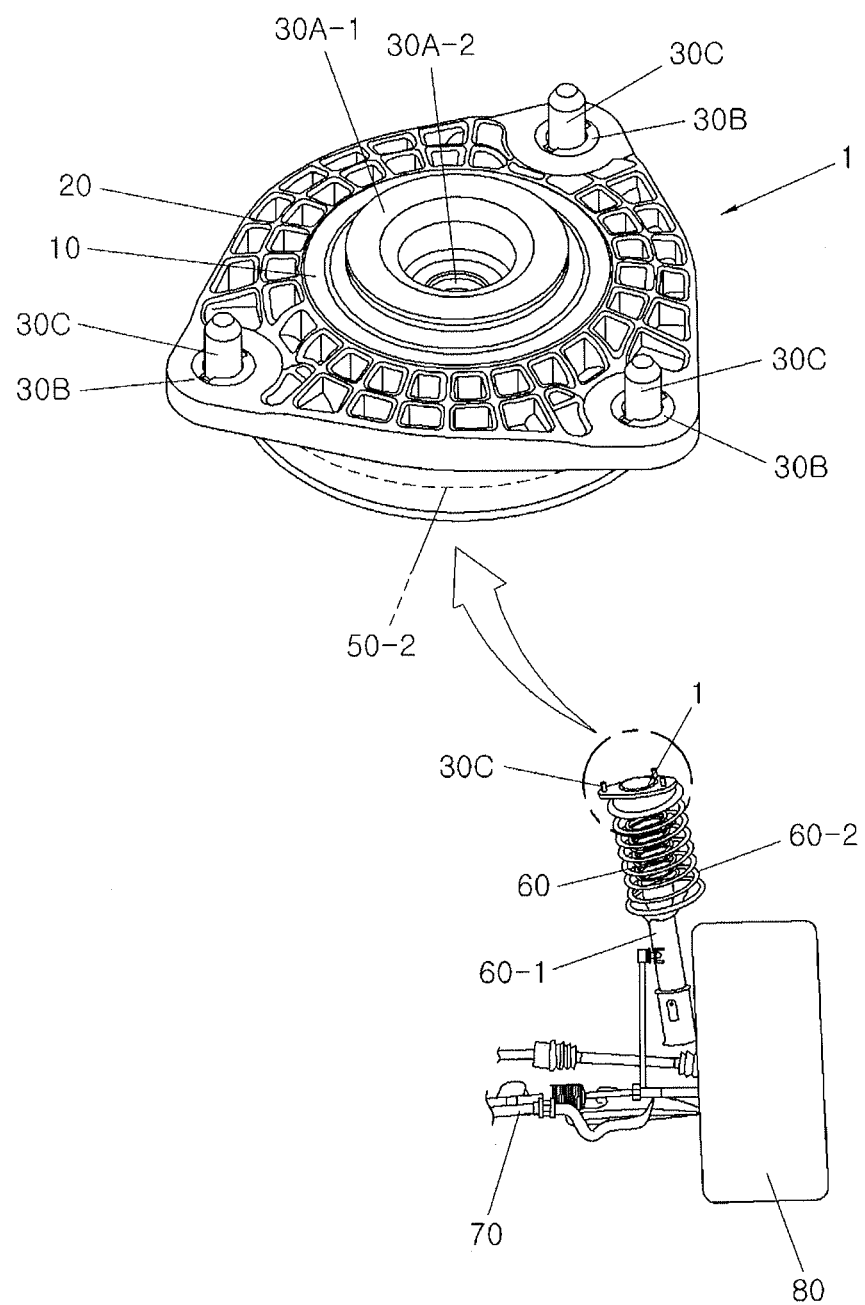
FIG. 11 is an exemplary diagram of suspension system to which the exemplary polymer composite strut insulator according to the present invention is applied.

FIG. 11 is an example of suspension system for a vehicle to which the polymer composite strut insulator 1 is applied in accordance with the present invention.

As shown in FIG. 11, the suspension system may include a suspension strut 60 having a shock absorber 60-1 with a cylinder housing, a coil spring type suspension spring 60-2 and the polymer composite strut insulator 1, and a stabilizer bar 70 for adjusting roll moment. The cylinder housing of the shock absorber 60-1 may be coupled to wheels 80 via a knuckle and the strut rod of the shock absorber 60-1 may be coupled to a vehicle body via the polymer composite strut insulator 1. Particularly, the polymer composite strut insulator 1 may include the polymer composite bracket 20, the upper and lower cups 30A-1, 30A-2, the inserter 30B, the mounting bolts 30C and the bearing 50-2 as described through FIG. 1A to FIG. 10. Therefore, the mounting bolts 30C may form the bolt-fastening force of the polymer composite strut insulator 1.

Therefore, the suspension strut 60 may improve ride comfort and maintain stability through vehicle height adjustment and impact absorbing as fundamental functions, further achieve the lightweight by polymer composite strut insulator 1, the improved vibration damping performance (Compliance) using polymer composite properties and the improved performance of vehicle Noise, Vibration, Harshness (NVH).

In the various embodiments of the present invention, the suspension system may be the Mcpherson strut suspension system, but is not limited thereto.

As described above, in the suspension system for a vehicle according to the various embodiments of the present invention, it is applied to the polymer composite strut insulator 1 including the polymer composite bracket 20 made of polymer composite and provided with the inserter 30B into which the mounting bolts 30C are press-inserted and penetrate for forming bolt-fastening force to the vehicle body, the elastic mass 10 molded to the polymer composite bracket 20 in such a vulcanization manner in order to form the central hole to which the pair of upper cup 30A-1 and lower cup 30A-2 is coupled, and the bearing 50-2 disposed at the bearing assembling portion 25 formed integrally to the polymer composite bracket 20, thereby capable of reducing its weight and the number of components, and particularly, the suspension system is made up with the polymer composite strut insulator 1 applied to the shock absorber 60-1, thereby capable of improving more effectively the NVH performance and productivity for vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A polymer composite strut insulator, comprising:
   a polymer composite bracket made of polymer composite, divided into a mounting fastening portion including a central hole and having an inserter into which mounting bolts are press-inserted to penetrate and a bearing assembling portion;
   an elastic mass cross-linked to the polymer composite bracket in order for a cup hole surrounding an inner portion of the central hole to be divided into an upper cup hole and a lower cup hole, the upper cup hole being coupled to an upper cup and the lower cup hole being coupled to a lower cup; and
   a bearing disposed at the bearing assembling portion.

2. The polymer composite strut insulator of claim 1, wherein the polymer composite comprises fiber reinforced plastics reinforced by glass fiber or carbon fiber.

3. The polymer composite strut insulator of claim 1, wherein the mounting fastening portion and the bearing assembling portion are connected to a rubber injection passage, the rubber injection passage is formed with cutaway grooves communicated with the central hole, and the mounting fastening portion, the bearing assembling portion and the rubber injection passage are injection-molded to be integrated with each other.

4. The polymer composite strut insulator of claim 3, wherein the mounting fastening portion is formed with insert holes into which the inserter is disposed respectively, and the insert holes are formed at at least three positions.

5. The polymer composite strut insulator of claim 3, wherein the bearing assembling portion comprises a lower hollow concentric body formed integrally with the rubber injection passage, a lower expansion concentric body surrounding the lower hollow concentric body to form a concentric circle, and an insert surface forming two stepped portions to the lower expansion concentric body.

6. The polymer composite strut insulator of claim 5, wherein the lower hollow concentric body includes an inner stepped surface with the rubber injection passage to form a concentric circle.

7. The polymer composite strut insulator of claim 5, wherein the insert surface is formed with a plurality of ribs.

8. The polymer composite strut insulator of claim 5, wherein the insert surface is provided with a bearing ball rail inserter made of metal, the bearing ball rail inserter is integrated with the bearing assembling portion when injection molding the bearing assembling portion, and the bearing is seated in the bearing ball rail inserter.

9. The polymer composite strut insulator of claim 1, wherein the elastic mass is made of rubber cross-linked using a rubber injection mold, and the upper cup hole and the lower cup hole have different inner diameters, respectively.

10. The polymer composite strut insulator of claim 1, wherein the upper cup and the lower cup are fixed via fixing portions coupled to each other while inserted into the upper cup hole and the lower cup hole, respectively.

11. The polymer composite strut insulator of claim 1, wherein the inserter includes a bolt shaft boss into which the mounting bolts are press-inserted to penetrate, a portion of the bolt shaft boss is thicker than other portions, and the inserter is integrated with the polymer composite bracket when injection molding the polymer composite bracket.

12. The polymer composite strut insulator of claim 11, wherein the inserter is made of carbon steel or forged aluminum material.

13. The polymer composite strut insulator of claim 1, wherein the bearing is coupled to the bearing assembling portion via a bearing sealer.

14. A suspension system for a vehicle, comprising:
   a shock absorber configured with a cylinder housing to be coupled to wheels via a knuckle;
   a suspension spring coupled to the shock absorber; and
   a polymer composite strut insulator coupled to a strut rod of the shock absorber to be fixed to a vehicle body;
   wherein the polymer composite strut insulator includes:
      a polymer composite bracket made of polymer composite, and divided into a mounting fastening portion having an inserter and a bearing assembling portion integrated with the mounting fastening portion via a rubber injection passage;

an elastic mass cross-linked to the polymer composite bracket and forming cup holes into which an upper cup and a lower cup coupled to each other are inserted;

mounting bolts press-inserted into and penetrating the inserter to be fixed to the vehicle body; and a bearing tightly contacted to a bearing ball rail inserter formed at the bearing assembling portion.

* * * * *